United States Patent [19]

Kurrle

[11] 4,117,191
[45] Sep. 26, 1978

[54] COMPOSITE SILICATE PIGMENT
[75] Inventor: Frederick L. Kurrle, Laurel, Md.
[73] Assignee: Westvaco Corporation, New York, N.Y.
[21] Appl. No.: 773,745
[22] Filed: Mar. 2, 1977

Related U.S. Application Data

[62] Division of Ser. No. 668,436, Mar. 19, 1976, Pat. No. 4,026,721.

[51] Int. Cl.$^2$ ............................................. B32B 5/16
[52] U.S. Cl. .................................. 428/330; 162/181 C; 162/181 D; 428/331; 428/452; 428/454
[58] Field of Search ............... 428/433, 454, 330, 331, 428/452; 162/181 C, 181 D; 106/288 B, 306, 308 B

[56] References Cited

U.S. PATENT DOCUMENTS

| | | | |
|---|---|---|---|
| 2,599,094 | 6/1952 | Craig | 162/181 C |
| 2,924,549 | 2/1960 | Klein et al. | 162/181 C |
| 3,227,607 | 1/1966 | Mays et al. | 162/181 C |
| 3,586,523 | 6/1971 | Fanselow et al. | 162/181 D |
| 3,690,907 | 9/1972 | Kroening et al. | 106/306 |

FOREIGN PATENT DOCUMENTS 42-12,291  7/1942  Japan ................................. 162/181 D

*Primary Examiner*—George F. Lesmes
*Assistant Examiner*—E. Rollins Buffalow

[57] ABSTRACT

A composite silicate pigment is prepared according to a precipitation reaction when spherical, hydrous metal silicate particles are precipitated on the planar surfaces of clay particles having a platelet-type structure. The result of the precipitation reaction is to a product having an unexpected improvement in optical efficiency as compared with the optical efficiency of the clay component alone. When incorporated in a sheet of paper or the like, the spherical metal silicate particles act as spacers between individual clay particles to produce void volume or light scattering sites which in turn provide improved optical properties to the paper.

7 Claims, 5 Drawing Figures

COMPOSITE SILICATE PIGMENT

This application is a Division of the copending application Ser. No. 668,436, filed Mar. 19, 1976, now U.S. Pat. No. 4,026,721.

BACKGROUND OF INVENTION

The present invention relates in general to inorganic composite pigments. More particularly, the invention relates to a composite pigment comprising clay and a metal silicate. The pigment is prepared according to a precipitation reaction wherein spherical, hydrous metal silicate particles are precipitated on the planar surfaces of clay particles having a platelet-type structure. Subsequently, when the composite pigment is incorporated in a sheet of paper or the like, the precipitated metal silicate particles act as spacers between individual clay particles to produce void volume or pigment-air interfaces and provide improved optical properties to the paper. The composite pigment so produced has an unexpectedly high light scattering power as compared with that of the base clay material alone, or as compared with that of a simple physical mixture of the two components. Moreover, with only a small amount of the metal silicate component precipitated on the base clay material, the optical efficiency of the composite pigment approaches that of the metal silicate component alone. Finally, based on the experimental data disclosed herein, the composite pigment of the present invention finds particularly good application in the papermaking process.

Clays are familiar components of the papermaking process and the term "clay" as used herein, refers to a class of earthly materials that are used as pigments in the papermaking process as filler materials, sizepress components and in coatings. For instance, as used in the paper industry, the term clay ordinarily refers to Kaolin or china clay, but it also includes attapulgite clay. In general however, the clays useful in the present invention are only those which have a platelet-type structure. Ordinary kaolin clay or kaolinite meets most of the requirements of a good papermaking pigment except for its low index of refraction, on the order of about 1.55. Therefore, clays are often used in the papermaking process in conjunction with more expensive and more optically efficient pigments in order to meet the optical requirements of the final product. In addition, the patent literature contains several teachings for modifying clay to produce a more optically efficient pigment. For instance, U.S. Pat. No. 2,296,637 discloses a process for acidifying a clay/sodium silicate mixture to increase the dry bulking value, oil absorption, and brightening and opacifying properties of clay. Moreover, U.S. Pat. No. 3,690,907 discloses a clay base pigment comprising a mixture of clay with an alkaline earth metal hydroxide that has improved optical properties.

On the other hand, metal silicates are also well known pigments in the paper industry. For instance, calcium silicates are sometimes used as fillers in paper to improve the bulk, opacity and brightness of the final product. However, calcium silicate, like clay, has a fairly low refractive index, on the order of about 1.50. Accordingly, like clay, calcium silicate is often modified or used in conjunction with other more optically efficient pigments to produce high quality papers.

Also, it is known to attach calcium silicate pigment to papermaking pulp to increase the pigment retention. For instance, in U.S. Pat. No. 2,599,094 (among others issued to W. L. Craig), there is disclosed a process for precipitating calcium silicate on cellulosic pulp fibers after pretreating the pulp with a chloride solution. In addition, U.S. Pat. No. 2,296,618 discloses a silicate modified titanium pigment with improved stability against heat and light. And, U.S. Pat. No. 2,296,639 discloses a zinc sulfide pigment coated with a metal silicate to produce increased oil absorption with what is said to be excellent surface hiding power. Meanwhile, in U.S. Pat. No. 2,786,777 (among others assigned to Columbia-Southern Chemical Corporation), there is disclosed a method for preparing a composite pigment with calcium silicate and alumina.

However, none of the above noted patents disclose a composite pigment comprising a metal silicate and clay, and none of the patents known to applicant disclose a precipitation reaction for precipitating a silicate pigment onto the planar surfaces of a platelet-type clay particle to produce a composite pigment having an unexpectedly high optical efficiency.

SUMMARY OF INVENTION

According to one aspect of the present invention there is provided a composite silicate pigment comprising a clay component and a metal silicate component. The clay component is preferably obtained from a class of papermaking clays known generally as kaolin clay or kaolinite and the metal silicate component is a water soluble alkali metal silicate such as sodium silicate. The preferred method for preparing the composite pigment comprises the steps of, (a) forming an aqueous suspension of a clay pigment, (b) blending into the clay slurry a quantity of a salt such as calcium chloride, (c) metering into the slurry of clay and salt at high shear a quantity of a silicate component such as sodium silicate, and, optionally, (d) adjusting the pH of the slurry with the addition of alum to a pH no lower than pH 4, before (e) filtering and washing the precipitated product to remove any soluble salts. The product obtained is then either used directly in the papermaking process or dried such as by spray drying or the like to form a powdered pigment for later use.

During the reaction, the spherical, hydrous metal silicate pigment particles are precipitated on the planar surfaces of the clay platelets. Later on, when incorporated in a sheet of paper or the like, the metal silicate particles act as spacers between individual clay particles, to create additional air interfaces on sheet drying. The result of the precipitation reaction is to produce a vast improvement in the optical efficiency of the clay component with as little as 10% silicate precipitated on the clay. In addition, the scattering coefficient of the composite pigment is considerably higher than the scattering coefficient of a physical mixture of the two component pigments.

Examples of water soluble salts of polyvalent metals that may be used in the process of the present invention include the water soluble salts of calcium, barium, zinc, magnesium, or the like. However, from a purely economical point of view, the calcium salts are deemed most desirable. The alkali metal silicate preferred for the invention is sodium silicate although other alkali metal silicates such as potassium silicate may be employed. In addition, different grades of clays having properties similar to those of kaolin clays or kaolinite may be employed in preparing the composite pigments disclosed. Of the polyvalent alkaline earth metal salts useful for the present invention, calcium chloride is the preferred soluble calcium salt, although other salts such as calcium nitrate or calcium acetate could be used. Of course, as noted hereinbefore, other water soluble chloride salts such as salts of barium, zinc or magnesium could also be used as a substitute for calcium chloride. The amount of alkaline earth metal salt added to the clay slurry should be proportioned so as to obtain an excess over the stoichiometric quantity required to react with the silicate component. The salt is added to the clay slurry under turbulent mixing conditions wherein the salt disassociates permitting the earth metal to become chemically attached to the clay particles. In the case of calcium chloride, the calcium ions attached to the clay and the chloride goes into solution. Generally, the preferred method is to add the alkaline earth metal salt to the clay slurry prior to adding the silicate component. However, reversing the order of addition still produces a precipitated product, albeit one having slightly less optical efficiency.

The silicate component is preferably a water soluble alkali metal silicate. More particularly, sodium silicate is preferred, but other water soluble alkali metal silicates such as sodium potassium silicate could be used. Sodium silicates containing between 2 and 5 moles (preferably 3 to 4 moles) $SiO_2$ per mole of $Na_2O$ are preferred since they are commercially available and, as a rule, the least expensive alkali metal silicates. The silicate component is added to the clay/salt slurry under high shear wherein an almost instantaneous precipitation reaction occurs between the earth metal ions on the clay and the silicate ions from the alkali metal silicate. The temperature of the reaction is not particularly critical and may range from about 20° C. to 85° C. The concentration of the silicate solution is correlated with the remaining variables so as to produce a final pigment having from about 10–90% of the spherical silicate particles precipitated on the clay platelets for improved optical efficiency.

The reaction of the present invention, if carried out without pH adjustment, generally proceeds at a pH of about pH 9. However the optical efficiency of the final precipitated product and the yield of the reaction can both be increased with a pH adjustment down to a pH no lower than pH 4. The pH of the reaction is preferably adjusted with the addition of alum. However other additives could be used depending upon the ultimate use of the pigment. In general, for wet end addition of the pigment on the papermachine as a filler material the pH should be fairly low or on the order of about pH 4. However, for coatings and sizepress application the pH need not be adjusted to as low a level as pH 4 for satisfactory results. In the latter cases, the reaction may be carried out at a neutral pH or at least on the alkaline side (pH 7 or above) with satisfactory results.

In the final stages of the process, the precipitated pigment is filtered and washed to remove any unwanted by products of the reaction such as soluble salts or the like. After washing and collecting the pigment, it may be used directly in the intended application or be further dewatered and dried for storage and/or shipment to the intended user.

DETAILED DESCRIPTION

The pigment of the present invention because of its good dispersibility and excellent optical efficiency is particularly suitable as a filler for use in the manufacture of paper. In addition, the pigment is also useful in the papermaking process as a component of the sizepress or in paper coatings. Moreover, the pigment could be used in the manufacture of paints or as a reinforcement in rubber compositions.

Figure 1:
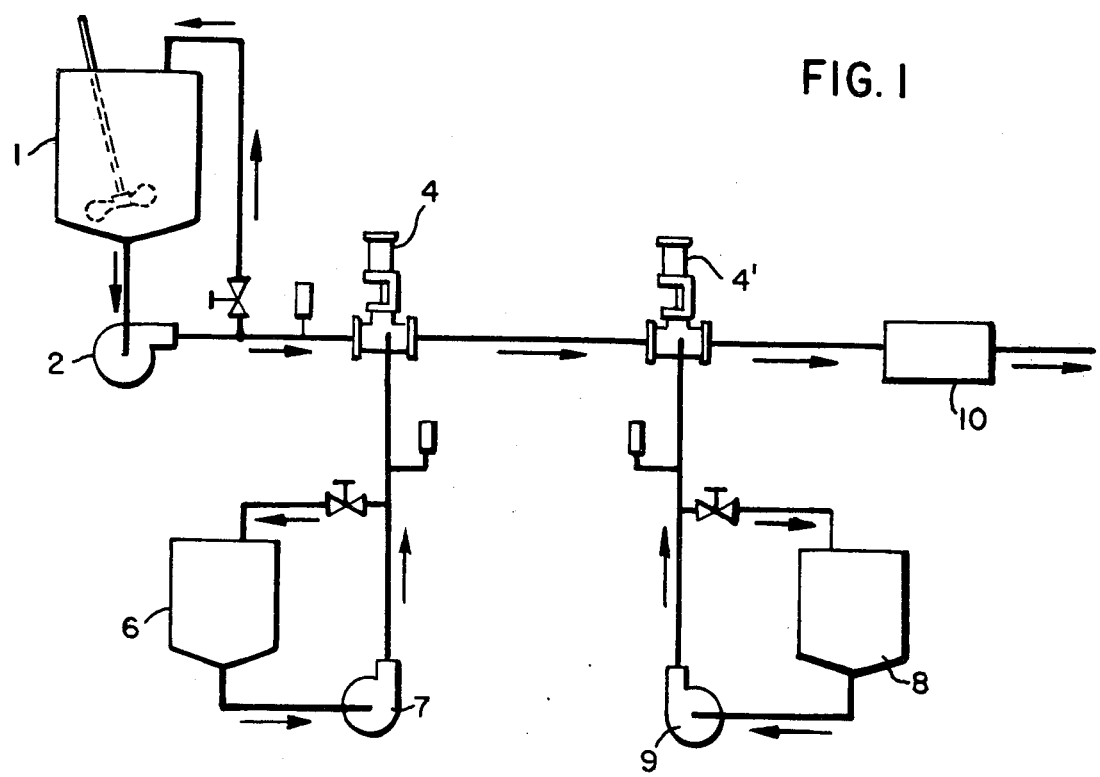
FIG. 1 shows a schematic representation of a typical flow sheet for the process of the present invention.
Figure 3:
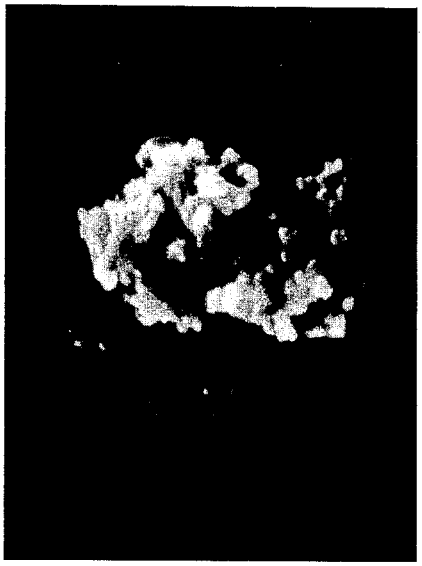
FIG. 3 is an electron micrograph showing the structure of a composite precipitated pigment according to the present invention consisting of 80% of the clay of FIG. 2 and 20% calcium silicate.
Figure 5:
Figure 2:
FIG. 2 is an electron micrograph showing the platelet structure of a typical kaolin clay.
Figure 4:
FIG. 4 is an electron micrograph showing the clay of FIG. 2 incorporated in a handsheet; and, FIG. 5 is an electron micrograph showing the composite precipitated pigment of FIG. 3 incorporated in a handsheet.

The pigment is preferably manufactured in a continuous manner according to a process as shown schematically in FIG. 1. For this purpose, a feed tank 1 is provided where the clay and a polyvalent metal salt are premixed under constant agitation. This mixture is pumped by pump 2 to one or more in-line mixers 4,4' where the clay/salt slurry is mixed with the alkali metal silicate component from tank 6 via pump 7. The precipitation reaction in the in-line mixers 4,4' must be under high shear to achieve a prompt salt induced precipitation of the siliceous material on the clay. Subsequently the pH of the precipitated pigment slurry may be adjusted to a pH no lower than about pH 4, for instance, by the addition of alum or the like from tank 8 via pump 9 to in-line mixer 4'. After pH adjustment, the pigment is washed to remove any soluble salts and filtered for ultimate use.

The following examples are given in illustration and are not intended as a limitation on the scope of the invention.

EXAMPLE I

The following procedure was used to prepare several composite pigments for an initial evaluation as a paper filler material. In each case, 160 grams of water and from 10–40 grams of clay were slurried in a beaker under low shear agitation. A quantity of $CaCl_2.2H_2O$ was then added to the clay slurry in dry form and allowed to mix for 15 minutes. The clay/$CaCl_2$ slurry was then added to a Waring blendor. Under high shear conditions, a 10% solids sodium silicate solution was added slowly to the clay/$CaCl_2$ slurry to induce precipitation of CaSil on the clay, and the mixture was allowed to mix for a total of 2 minutes. Subsequently, sufficient papermakers alum was added to the mixture to adjust the pH to from about pH 4–4.5. Mixing was continued for an additional 2 minutes. The reaction product of clay with CaSil precipitated thereon was then washed in a Buchner funnel to remove soluble salt by-products and the composite pigment was available for evaluation in handsheets.

Several sodium silicate grades were evaluated having molar ratios of $SiO_2:Na_2O$ ranging from 2.50–3.75:1. However, for the experiment noted above, an "0" grade sodium silicate having a $SiO_2:Na_2O$ molar ratio of 3.22:1 was selected for optimum optical efficiency of the final product and because of its lower price. Five commercially available Georgina Kaolin clays were used ranging from a large particle size WP filler clay (60% of particles finer than 2 microns) to a fine particle size Hydragloss 90 coating clay (97% of particles finer than 2 microns). Additionally, a delaminated clay, Nuclay, was included in the experiments. In each case, the ratio of clay to sodium silicate in the composite pigment was varied at 20% intervals from 0 to 100%. The ratio of sodium silicate to $CaCl_2.2H_2O$ was held constant at 2.8 to 1. Table I shows typical additive concentrations for the clay/calcium silicate composite products.

TABLE I
Additive Concentrations-Pigment Preparation

| Pigment Composition % | Water gr. | Clay gr. | $CaCl_2$ $2H_2O$ gr. | Sodium Silicate gr. | Alum gr. |
|---|---|---|---|---|---|
| 80 Clay 20 CaSil | 160 | 40 | 3.57 | 10 | 8 |
| 60 Clay 40 CaSil | 160 | 30 | 7.14 | 20 | 12 |
| 40 Clay 60 CaSil | 160 | 20 | 10.71 | 30 | 18.5 |
| 20 Clay 80 CaSil | 160 | 10 | 14.28 | 40 | 26.0 |
| 100 CaSil | 160 | 0 | 17.85 | 50 | 27.7 |

Tables II–VI summarize the optical performance of the composite pigments prepared with the different base clays. The optical properties were determined from handsheets which contained about 5% by weight of the composite pigment. Handsheets incorporating physical mixtures of clay and $TiO_2$ were also prepared for comparison with the optical performance of the composite pigments. In each case, a standard pulp blend was used for the fiber furnish and handsheets were prepared according to standard TAPPI methods.

TABLE II
Optical Comparison - WP Filler Clay

| Pigment Composition % | Brightness | Opacity | Filler % | Scattering Coefficient S' |
|---|---|---|---|---|
| Control | 78.4 | 72.5 | — | — |
| 100 WP clay | 79.3 | 75.9 | 4.93 | .158 |
| 80 Clay 20 CaSil | 80.5 | 77.7 | 4.75 | .241 |
| 60 Clay 40 CaSil | 81.1 | 78.5 | 4.79 | .273 |
| 40 Clay 60 CaSil | 82.1 | 78.9 | 4.71 | .304 |
| 20 Clay 80 CaSil | 82.4 | 78.4 | 4.45 | .317 |
| 80 Clay 20 $TiO_2$ | 81.1 | 79.3 | 5.23 | .293 |
| 60 Clay 40 $TiO_2$ | 82.3 | 80.9 | 5.04 | .405 |
| 40 Clay 60 $TiO_2$ | 83.0 | 82.0 | 4.99 | .465 |
| 20 Clay 80 $TiO_2$ | 83.3 | 82.8 | 5.01 | .521 |

TABLE III
Optical Comparison - PDM Filler Clay

| Pigment Composition % | Brightness | Opacity | Filler % | Scattering Coefficient S' |
|---|---|---|---|---|
| Control | 78.9 | 71.5 | — | — |
| 100 PDM Clay | 78.7 | 74.9 | 4.08 | .156 |
| 80 Clay 20 CaSil | 81.1 | 78.7 | 5.01 | .300 |
| 60 Clay 40 CaSil | 81.5 | 78.7 | 4.36 | .330 |
| 40 Clay 60 CaSil | 82.1 | 79.6 | 4.64 | .380 |
| 20 Clay 80 CaSil | 82.3 | 79.5 | 4.30 | .400 |
| 80 Clay 20 $TiO_2$ | 80.8 | 79.0 | 5.05 | .300 |
| 60 Clay 40 $TiO_2$ | 82.2 | 81.0 | 5.02 | .410 |
| 40 Clay 60 $TiO_2$ | 83.0 | 82.9 | 5.25 | .500 |
| 20 Clay 80 $TiO_2$ | 83.3 | 83.2 | 4.44 | .620 |

TABLE IV
Optical Comparison - Ultra White 90 Clay

| Pigment Composition % | Brightness | Opacity | Filler % | Scattering Coefficient S' |
|---|---|---|---|---|
| Control | 78.4 | 71.8 | — | — |
| 100 UW 90 Clay | 79.0 | 75.1 | 5.36 | .13 |
| 100 $TiO_2$ | 83.3 | 84.0 | 4.45 | .66 |
| 100 CaSil | 82.4 | 79.0 | 4.15 | .37 |
| 80 Clay 20 CaSil | 80.9 | 77.2 | 4.28 | .26 |
| 60 Clay 40 CaSil | 81.7 | 78.9 | 4.44 | .37 |
| 40 Clay 60 CaSil | 81.3 | 78.6 | 3.74 | .37 |
| 20 Clay 80 CaSil | 81.8 | 78.6 | 4.13 | .34 |
| 80 Clay 20 $TiO_2$ | 78.9 | 78.5 | 4.53 | .27 |
| 60 Clay 40 $TiO_2$ | 81.6 | 79.8 | 4.84 | .34 |
| 40 Clay 60 $TiO_2$ | 82.7 | 82.0 | 5.05 | .46 |
| 20 Clay 80 $TiO_2$ | 83.0 | 83.6 | 5.13 | .55 |

TABLE V
Optical Comparison - Hydragloss 90 Clay

| Pigment Composition % | Brightness | Opacity | Filler % | Scattering Coefficient S' |
|---|---|---|---|---|
| Control | 77.6 | 71.7 | — | — |
| 100 Hydragloss 90 | 78.2 | 73.7 | 5.49 | .100 |
| 80 Clay 20 CaSil | 81.2 | 78.7 | 5.11 | .291 |
| 60 Clay 40 CaSil | 81.6 | 79.4 | 5.06 | .327 |
| 40 Clay 60 CaSil | 82.2 | 80.1 | 5.06 | .327 |
| 20 Clay 80 CaSil | 82.5 | 79.3 | 4.88 | .357 |
| 80 Clay 20 $TiO_2$ | 80.6 | 77.4 | 5.42 | .220 |
| 60 Clay 40 $TiO_2$ | 82.1 | 80.1 | 5.32 | .365 |
| 40 Clay 60 $TiO_2$ | 83.3 | 82.5 | 5.39 | .471 |
| 20 Clay 80 $TiO_2$ | 83.9 | 83.5 | 5.41 | .552 |

TABLE VI
Optical Comparison - Nuclay Clay

| Pigment Composition % | Brightness | Opacity | Filler % | Scattering Coefficient S' |
|---|---|---|---|---|
| Control | 79.0 | 71.7 | — | — |
| 100 Nuclay | 79.8 | 75.7 | 5.03 | .164 |
| 80 Clay 20 CaSil | 81.5 | 78.3 | 5.17 | .272 |
| 60 Clay 40 CaSil | 82.3 | 79.2 | 4.77 | .346 |
| 40 Clay 60 CaSil | 82.5 | 79.5 | 4.93 | .353 |
| 20 Clay 80 CaSil | 82.0 | 77.7 | 3.74 | .344 |
| 80 Clay 20 $TiO_2$ | 81.7 | 78.9 | 4.91 | .296 |
| 60 Clay 40 $TiO_2$ | 82.8 | 80.8 | 4.93 | .397 |
| 40 Clay 60 $TiO_2$ | 83.7 | 82.5 | 4.87 | .531 |
| 20 Clay 80 $TiO_2$ | 84.2 | 83.6 | 5.07 | .586 |

Surface areas of the clays used in Example I ranged from 8 m²/gr. for the Georgia Kaolin WP filler grade to 22 m²/gr. for the Hydragloss 90 coating grade clay from Huber Corporation. Table II summarizes the optical comparisons of the composite pigment manufactured with the WP filler grade clay. The composite pigment containing 80% WP clay with 20% CaSil precipitated thereon had an unexpected improvement in optical efficiency as compared with the WP clay alone. However, the same pigment was slightly poorer in opacity development than a physical mixture of 80% WP clay and 20% TiO₂. In a similar manner, as shown in Table III, the composite pigment containing 80% PDM clay with 20% CaSil precipitated thereon had a drastic and unexpected increase in optical efficiency as compared with the PDM clay alone. Moreover, the same pigment was equivalent in opacity development to a physical mixture of 80% PDM clay and 20% TiO₂. Similar trends were found for the other clays used as demonstrated by the data in Tables IV–VI. In addition, the data showed that the scattering coefficient of the base clay materials generally increased as the amount of CaSil precipitated thereon increased.

Table VII shows some relationships between the surface areas of the base clay materials, the surface areas of the composite pigments prepared from the base clays and general relationships between the particle size distribution of the clays and the percent increase in scattering coefficient achieved with the composite pigments. In each case, the particle size distribution of the composite pigments were found to be substantially the same as the particle size distribution of the base clay materials used in each case. As shown in the drawings (FIGS. 2–5), the relatively small spherical particles of calcium silicate that are precipitated onto the clay platelets do not significantly alter the overall particle size distribution of the base material.

TABLE VII

Scattering Coefficient (S') vs. Particle Size Distribution

| Pigment Composition % | | Surface Area m²/gr. | Scattering Coefficient s' | Scattering Coefficient % increase |
|---|---|---|---|---|
| Ultra White 90 Clay - 90% Finer than 2 microns | | | | |
| 100 | Clay | 12.6 | .13 | — |
| 80 | Clay | 16.4 | .26 | 100 |
| 20 | CaSil | | | |
| 60 | Clay | 20.5 | .37 | 169 |
| 40 | CaSil | | | |
| Nuclay clay - 80% Finer than 2 microns | | | | |
| 100 | Clay | 11.7 | .164 | — |
| 80 | Clay | 23.1 | .272 | 65.8 |
| 20 | CaSil | | | |
| 60 | Clay | 28.5 | .346 | 111 |
| 40 | CaSil | | | |
| PDM Filler Clay - 67% Finer than 2 microns | | | | |
| 100 | Clay | 12.1 | .156 | — |
| 80 | Clay | 23.7 | .241 | 54.5 |
| 20 | CaSil | | | |
| 60 | Clay | 21.5 | .273 | 75 |
| 40 | CaSil | | | |

The data in Table VII demonstrates the importance of the selection of the commercially available base clay material in optimizing the contribution of the silicate component. As the particle size distribution of the base clay material in the composite pigment increases in fineness, the contribution of the silicate component is enhanced. Further, with increasing clay particle fineness, and at higher levels of substitution of the silicate component, the composite pigments provide equivalent optics when compared to the same level of TiO₂ addition. With the finer particle size coating clays, equivalent optical efficiency was obtained up to and including the 60% clay-40% CaSil or 40% TiO₂ filler systems. Accordingly, the data demonstrates that it is possible to duplicate the optical contribution of TiO₂ in a paper substrate with the composite pigment of the present invention where from 20–40% of the total wet end filler would be TiO₂.

EXAMPLE II

Samples of the composite pigment were prepared with a pilot plant apparatus substantially as disclosed in FIG. 1 except that only one in-line mixer was used. The pH adjustment with papermakers alum was made in small batches prior to filtering and washing of the composite product. PDM premium filler clay supplied by Georgia Kaolin was used in one set of experiments (Table VIII) and Ultra White 90 coating grade clay was used in a second set of experiments (Table IX). "0" grade sodium silicate supplied by Philadelphia Quartz Company was selected as the silicate component and calcium chloride as the salt component of the process. The sodium silicate solution concentration was varied from about 0.42–1.68 lbs/gal. at flow rates of from about 0.60–1.14 gal./min. into a clay/salt slurry containing 1.9–3.07 lbs/gal. of clay and from about 0.17 to 0.27 lbs/gal. of salt. From these reactions, several composite pigments were obtained, filtered and washed. The composite pigment prepared in the first experiment (Table VIII) consisted of 80% PDM clay and 20% calcium silicate. In the second experiment (Table IX), the Ultra White 90 clay component was varied from 60–90% and the calcium silicate component from 40–10%. The pigments were incorporated into standard TAPPI handsheets as a filler material and the optical properties were measured.

TABLE VIII

Composite Pigment - Optical Comparisons
PDM Filler Clay - Continuous Process

| Pigment Composition % | Brightness | Opacity | Filler % | Scattering Coefficient S' |
|---|---|---|---|---|
| Control | 79.0 | 71.5 | 0.50 | — |
| 100 PDM Clay | 79.3 | 75.3 | 5.02 | .155 |
| 100 PDM Clay | 80.0 | 79.5 | 9.86 | .179 |
| 80 Clay 20 CaSil | 80.8 | 77.6 | 4.67 | .257 |
| 80 Clay 20 CaSil | 81.8 | 82.1 | 8.90 | .277 |
| 80 Clay 20 CaSil | 81.1 | 77.2 | 4.94 | .236 |
| 80 Clay 20 CaSil | 82.1 | 82.4 | 10.11 | .259 |

TABLE IX

Composite Pigment - Optical Comparisons
Ultra White 90 Clay-Continuous Process

| Pigment Composition % | Brightness | Opacity | Filler % | Scattering Coefficient S' |
|---|---|---|---|---|
| Control | 78.5 | 70.3 | — | — |
| 100 UW 90 Clay | 79.2 | 74.4 | 5.30 | .157 |
| 80 Clay 20 CaSil | 81.0 | 77.5 | 5.25 | .278 |
| 90 Clay 10 CaSil | 81.0 | 78.0 | 5.23 | .300 |
| 60 Clay 40 CaSil | 82.2 | 80.3 | 5.42 | .396 |

Each of the composite pigments observed in Tables VIII and IX were prepared with an agitation rate in the in-line mixer of 1700 rpm and incorporated in handsheets at the levels shown. Samples collected at lower speeds did not show any significant changes in optical performance. Two washes of the filter cake were performed on each batch using 1.6 parts water per 1 part pigment to remove up to 93% of the sodium salt by-product produced during the reaction. A comparison of the data obtained from the pigments prepared in Example II with the data obtained from the pigments prepared in Example I shows that the product prepared in the continuous process apparatus produced about the same results as the product prepared with the bench scale Waring blendor apparatus.

EXAMPLE III

Composite pigments using as base clay materials Ultra White 90 clay and Nuclay were produced according to the continuous process described in Example II. The pigments produced were incorporated in size press formulations and applied to a Westvaco Corporation basestock in web form. A gate roll size press apparatus was used to apply the formulations to produce a 61 lb/ream envelope paper and a 48 lb/ream Clear Spring offset grade, both of which are commercial products of Westvaco Corporation. For the purpose of this Example, a ream is defined as 500 sheets of paper measuring 22 × 38 inches. The sizepress formulations were prepared with composite pigments containing 80% UW 90 clay and 20% CaSil, 80% Nuclay and 20% CaSil and 90% UW 90 clay and 10% CaSil. The formulations containing the 80/20 composite pigments each comprised by weight about 40 parts starch and 60 parts pigment, while the formulations containing the 90/10 composite pigment contained by weight about 35 parts starch and 65 parts pigment. The component parts were slurried in water to a solids content of from about 22–28%. The gate roll size press apparatus was operated with an applicator roll speed of 400 fpm and adjusted to give a pick up of less than about 5 lb/ream. After sizing, the web was dried and sheeted, with sample sheets being analyzed to determine their optical properties and printability. The results are set forth in Table X.

TABLE X

Optical and Strength Comparisons

Sizepressed Envelope Grade

| Pigment Composition % | Coat Weight (lbs/ream) | Brightness | Opacity | Wax Pick |
|---|---|---|---|---|
| Basestock 100 UW90 | — | 80.4 | 92.2 | 9 |
| Clay 100 Nuclay | 4.3 | 79.5 | 92.0 | 14+ |
|  | 4.7 | 79.9 | 92.5 | 14+ |
| 80 UW90 20 CaSil | 4.8 | 81.5 | 93.6 | 12 |
| 80 Nuclay 20 CaSil | 5.5 | 81.0 | 93.6 | 13 |
| 90 UW90 10 CaSil | 4.8 | 80.9 | 93.1 | 14+ |

Clear Spring Offset Grade

| | | | | |
|---|---|---|---|---|
| Basestock | — | 81.4 | 89.0 | 12 |
| 80 UW90 20 CaSil | 2.7 | 82.2 | 90.1 | 13 |
| 80 Nuclay 20 CaSil | 2.7 | 81.6 | 90.2 | 14+ |
| 90 UW90 10 CaSil | 2.1 | 82.2 | 89.7 | 13 |

The data in Table X shows that optical improvements achieved with the composite pigment were significant as compared with the control formulations containing only Nuclay or Ultra White 90 clay. Examination of the sizepressed paper samples also showed that the formulations containing the composite pigments produced a more uniform surface. The composite pigment formulations also appeared to wet more uniformly than the control when a drop of water was applied. Wax pick, a measure of the pick strength of the paper in offset printing, did not decrease any significant amount with the application of the composite pigment formulation. These results were confirmed with laboratory print tests where no differences in picking tendency were observed between the paper sized with the composite pigment formulations and the paper sized with the control formulations. In addition, ink show-through was greatly reduced with the composite pigment formulations while the sheet appearance was greatly improved.

The composite pigment of the present invention is also useful in coating formulations for paper. $TiO_2$ pigment is generally used in paper coatings to produce sheets having high opacity and brightness and because of the good hiding power of the pigment. However, $TiO_2$ is a fairly abrasive material (typical Valley abrasion of about 25 mg.) and it is expensive. Thus, replacements for $TiO_2$ in paper coatings are constantly being sought.

EXAMPLE IV

Coating formulations were prepared in which the conventionally used $TiO_2$ was replaced with an equal weight amount of the composite pigment of the present invention. For this purpose, a composite pigment consisting of 90% Ultra White 90 clay and 10% calcium silicate was produced according to the continuous process disclosed in Example II. Three coating formulations were prepared including a control coating containing no $TiO_2$, a second coating comprising 5% $TiO_2$ and a third experimental coating color comprising 5% of the 90/10 composite pigment all percentages by weight. Each coating formulation also contained clay, chalk, starch and a latex prepared according to a standard formula. The control coating had a Brookfield viscosity of 14,000 cps at 60.4% solids while the composite pigment coating had a Brookfield of 20,000 cps at 59.8% solids. The coatings were applied by trailing blade to a 38 lb/ream Field Web Offset basestock (Westvaco Corporation product) at six different blade loadings to produce coat weights ranging from about 5 to 13 lbs/ream. The coated basestocks were dried, calendered 3 nips at 600 pli and 150° F. and then sheeted to obtain samples from which the data in Table XI was obtained.

TABLE XI

Composite Pigment/$TiO_2$ Coating Formulations Optical and Strength Comparisons

| Coat Weight #/ream | Bulk Smoothness | Gloss | Opacity | Brightness | Wax Pick |
|---|---|---|---|---|---|
| 5% $TiO_2$ | | | | | |
| 5.2 | 928 | 51 | 87.1 | 74.3 | 7 |
| 6.6 | 1088 | 57 | 87.7 | 74.8 | 7 |
| 7.9 | 1224 | 59 | 88.7 | 75.5 | 7 |
| 9.1 | 1296 | 61 | 89.1 | 75.8 | 7 |
| 9.9 | 1335 | 62 | 89.5 | 76.1 | 7 |
| 12.0 | 1467 | 66 | 90.5 | 76.4 | 7 |
| Composite Pigment 5% | | | | | |
| 5.0 | 1057 | 48 | 86.5 | 73.6 | 7 |
| 6.1 | 1329 | 54 | 87.1 | 73.8 | 7 |
| 7.6 | 1330 | 57 | 87.7 | 74.4 | 7 |
| 9.4 | 1253 | 58 | 88.7 | 74.7 | 7 |
| 10.8 | 1561 | 58 | 89.6 | 74.9 | 6 |
| 12.8 | 1174 | 55 | 90.4 | 75.8 | 6 |
| Control | | | | | |
| 5.5 | 867 | 47 | 86.2 | 73.3 | 8 |
| 7.0 | 1082 | 55 | 87.3 | 73.7 | 8 |

TABLE XI-continued

| | | | | | |
|---|---|---|---|---|---|
| 8.0 | 1182 | 56 | 87.8 | 74.0 | 7 |
| 9.4 | 1357 | 58 | 88.3 | 74.3 | 7 |
| 9.9 | 1381 | 59 | 88.9 | 74.4 | 7 |
| 13.1 | 1312 | 58 | 89.8 | 74.7 | 7 |

As may be observed from the data in Table XI, a coating formulation in which $TiO_2$ was replaced with an equal weight amount of a 90/10 composite pigment produced coated paper having optical properties (opacity and brightness) that fell about midway between those of the paper coated with the standard formulation containing $TiO_2$ and the control formulation without $TiO_2$. Gloss measurements for the composite pigment formulation were slightly lower than those obtained with the standard formulation while the smoothness increased. Based on other data (not disclosed), the Valley abrasion of the composite pigment used in Example IV would range from about 8-12 mg., or lower than that of $TiO_2$, while the cost advantage of using the composite pigment would be substantial, i.e., less than the cost of $TiO_2$. Accordingly it may be seen that the composite pigment of the present invention offers a good choice for the replacement of $TiO_2$ in paper coating formulations.

While the present invention has been described and illustrated by the examples shown, it is not intended to be strickly limited thereto, and other variations and modifications may be employed within the scope of the following claims.

I claim:

1. Paper comprising cellulosic pulp fibers and the addition of sufficient filler material to improve the optical properties of the pulp fibers, the improvement which comprises as the filler material a composite white pigment comprising a clay pigment component having a platelet type structure, said platelets having planar surfaces, and a metal silicate pigment component in the form of spherical particles of an alkaline earth metal silicate precipitated on the planar surfaces of the clay platelets, said metal silicate component comprising from about 10-90% by weight of the total composite pigment.

2. Paper according to claim 1 wherein the clay pigment component comprising the mineral Kaolinite.

3. Paper according to claim 2 wherein the metal silicate pigment component is comprised of the reaction product of a water soluble alkali metal silicate and a water soluble salt of a polyvalent metal.

4. Paper according to claim 3 wherein the water soluble alkali metal silicate is sodium silicate and the water soluble salt of a polyvalent metal is calcium chloride.

5. Paper according to claim 4 wherein the metal silicate pigment comprises calcium silicate.

6. Paper suitable for use as a printing paper and consisting essentially of a paper web or paper sheets bearing on a surface thereof at least about 5 lbs./ream of an aqueous coating composition comprising pigment and a binder, said binder being present in an amount sufficient to bond the pigment to the paper, said coating being the substantially dried residue of the aqueous dispersion of pigment and binder, the improvement which comprises as the pigment a composite white pigment comprising a clay pigment component having a platelet type structure, said platelets having planar surfaces, and a metal silicate pigment component in the form of spherical particles of an alkaline earth metal silicate precipitated on the planar surfaces of the clay platelets, said metal silicate component comprising from about 10-90% by weight of the total composite pigment.

7. Paper according to claim 6 wherein the clay pigment component comprises the mineral kaolinite.

* * * * *